July 8, 1941. A. W. GRIEPENSTROH 2,248,865
SHOCK ABSORBING STRUT
Filed April 11, 1939
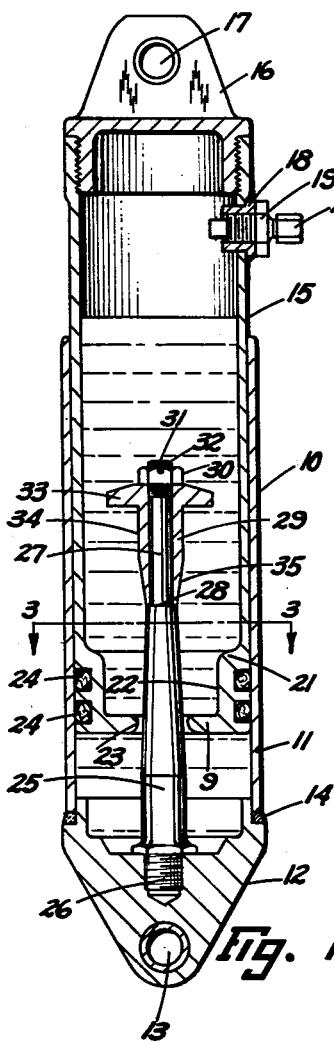
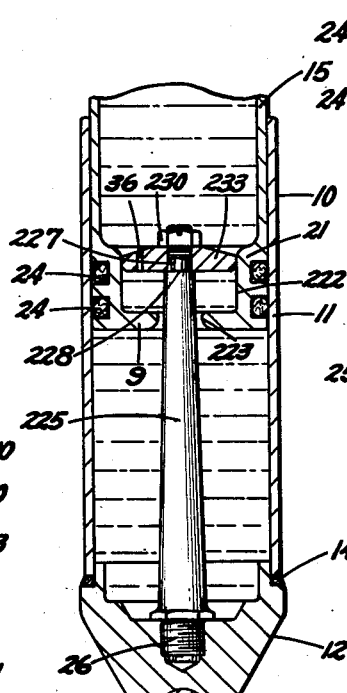
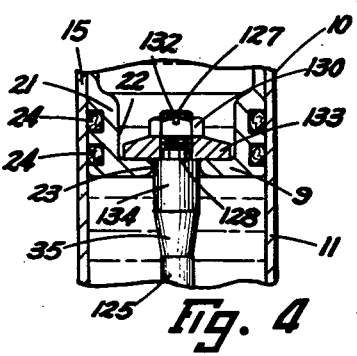
INVENTOR
ARTHUR W. GRIEPENSTROH
BY
ATTORNEY Patented July 8, 1941

2,248,865

UNITED STATES PATENT OFFICE 2,248,865

SHOCK ABSORBING STRUT

Arthur W. Griepenstroh, Garfield Heights, Ohio, assignor to The Cleveland Pneumatic Tool Company, Cleveland, Ohio, a corporation of Ohio Application April 11, 1939, Serial No. 267,276

5 Claims. (Cl. 267—64)

This invention relates broadly to shock absorbers, but more particularly to shock struts interposed between the fuselage or wings and the landing wheels of an aircraft for absorbing the landing shocks of the craft and resiliently supporting the same when taxiing.

One object of this invention is to construct such shock absorbers or struts in a manner calculated to form a simple and comparatively light assembly which is strong, durable and relatively inexpensive to manufacture.

Another object of this invention is to eliminate in the design of such struts, the usual stuffing box heretofore used for preventing leakage between the relative movable parts of the strut.

Another object of this invention is to produce an improved shock absorber of the above mentioned type wherein the usual metering pin, heretofore used solely for controlling the displacement of the liquid from one to the other of the telescoping cylinders, is now associable with the piston of the shock absorber for limiting the extension stroke of the strut.

Other objects and advantages more or less ancillary to the foregoing reside in the specific construction and aggroupment of the elements peculiar to this structure, as will become apparent from a more complete examination of this specification.

In the drawing:

Fig. 1 is a side elevational sectional view of a shock absorber embodying the invention and shown in a partly compressed condition.

Fig. 2 is a view similar to Fig. 1 showing the shock absorber in the fully extended condition.

Fig. 3 is an enlarged cross sectional view taken in a plane indicated by line 3—3 in Fig. 1.

Fig. 4 is a fragmental sectional view of a modification of the invention.

Fig. 5 is a view similar to Fig. 4 illustrating another modification of the invention.

Referring to the drawing; the shock absorber or strut generally designated by 10 includes an outer cylinder 11 closed at its lower end by a terminal 12 having a bushed aperture 13 extending therethrough and adapted to receive connecting means through which this cylinder may be attached to the landing wheel of the craft. In practice, the terminal 12 is rigidly secured to the cylinder 11 by any suitable means such as a weld 14.

Reciprocable within the cylinder 11, there is a piston tube or inner cylinder 15 closed at its upper end by a terminal 16, preferably welded in position, and provided with a bushed aperture 17 adapted to receive connecting means through which the cylinder 15 may be attached to the fuselage or the wing of the craft. Within the upper end portion of the cylinder 15, its side wall carries an internally threaded bushing 18 having mounted therein a filler plug 19 and an air valve 20.

As shown in the drawing, the portion of the outer cylinder 11 slidable over the inner cylinder 15 is of a uniform internal diameter substantially equal to the external diameter of the corresponding portion of the inner cylinder, thereby affording long bearing surfaces between the two cylinders or casings 11 and 15. The end of the cylinder 15 is shaped to form a piston 21 comprising a cross wall 9 forming an inner end plate for the inner cylinder 15, and a counterbore or dashpot 22 formed by a reduction of the internal diameter of the inner cylinder 15 adjacent the end plate 9. To afford a fluid tight joint between the cylinders 11 and 15, the piston 21 carries two longitudinally spaced packing rings 24 of any suitable design.

Carried by the terminal or end closure 12 of the cylinder 11, there is a metering pin 25 rigidly secured to the terminal 12 by any suitable means such as a screw threaded connection 26. The pin 25, which is preferably tapered as shown in Fig. 1, extends centrally through the orifice 23 into the cylinder 15. In Figs. 1 and 2, the upper end portion of the pin is reduced in diameter to form a cylindrical shank 27 and an annular shoulder 28. Mounted on the shank 27, there is a terminal 29 clamped on the annular shoulder 28 by a nut 30 screwed on the threaded outer end 31 of the shank 27, and held thereon against accidental rotation by any suitable means such as a cotter pin 32. The terminal 29 is of a profile calculated to form a head or dash-piston 33 and a stem 34. The diameter of the head 33 is somewhat smaller than that of the counterbore or dash-pot 22, while the stem 34 hereinafter referred to as the knobbed portion of the pin, is of a diameter substantially equal or somewhat smaller than that of the orifice 23 and is terminated by an inner portion 35 tapered inwardly into an end diameter corresponding to that of the annular shoulder 28.

In the modification shown in Fig. 4, the knob 134 is formed as an integral part of the pin 125, which pin is formed with a screw threaded shank 127 extending upwardly from the knob 134 and forming at its junction therewith an annular shoulder 128 having seated thereon a head or dash-piston 133 corresponding to the head 33 in Fig. 1, which head 133 is secured in position by a nut 130 held against accidental rotation by a cotter pin 132.

In the modification in Fig. 5, the metering pin 225 instead of being formed with a knob, is tapered substantially the full length thereof and terminated, at its upper end, by a cylindrical head or dash-piston 226 clamped on an annular shoulder 228 by a nut 230 screwed on the threaded shank 227. In this modified construction the dash-piston 226 is of a diameter substantially equal to that of the dash-pot 222, while the orifice 223 is of a diameter substantially equal to that of the orifice 23 in Fig. 1. Extending longitudinally through the dash-piston 226, there is a small port 36.

Before assembly, the shock absorber is fully compressed and liquid such as oil is poured into the cylinder 15 by removing the filler plug 19 until the level of the liquid reaches the bushing 18. Thereafter, the plug 19 is again secured in position and compressed air is introduced into the cylinder 15 through the air valve 20 until the air in the cylinder reaches a predetermined pressure calculated to cause a partial extension of the shock absorber when in static operative supporting position.

In operation, during taxiing of the craft, the shock absorber, due to the action of the compressed air on the liquid stored within the cylinders 15 and 11, will resiliently support the craft relatively to its landing wheel, or more specifically cushion movement of the craft relative to the landing wheels or ground engaging members. After taking off, that is when the landing wheels are out of engagement with the ground, the shock absorber due to the weight of the wheel together with the action of the compressed air stored within the cylinder 15 will expand into the position shown in Fig. 2. In this instance, the liquid from the cylinder 15 is forced to flow into the cylinder 11 through the piston orifice 23, which orifice is controlled by the metering pin 25. As the shock absorber reaches the end of its extension stroke, the knob 34 of the pin 25 entering the orifice 23 will greatly reduce the liquid conveying capacity of the orifice and consequently retard the flow of the liquid therethrough, thereby checking the rate of speed at which the cylinder 11 moves relative to the cylinder 15. As the knob 34 enters the orifice 23, the dash-piston or head 33 will also enter the dash-pot 22, thereby resulting in a dash-pot action cooperating with the knob 34 within the orifice 23 for preventing sudden engagement of the head 33 with the cross wall 9 of the piston 21, which engagement of course limits the extension stroke of the strut.

In the modification shown in Fig. 4, the action of the metering pin knob 134 and dash-piston or head 133 is identical to that of the knob 34 and head 33 for cushioning the engagement of the head 133 with the piston 21.

With reference to the modification shown in Fig. 5, as the shock absorber reaches the end of its extension stroke, the metering pin head or dash-piston 226 entering the counterbore or dash-pot 222 will force displacement of the liquid from the cylinder 15 into the cylinder 11 via the restricted port 36, thereby checking the rate of speed at which the cylinder 11 moves relative to the cylinder 15, and consequently cushioning or preventing sudden impacts of the head 226 with the piston 21.

When landing, the contact of the landing wheel with the ground will tend to cause compression of the shock absorber and the consequential displacement of the liquid from the cylinder 11 into the cylinder 15 through the piston orifice 23, which orifice in Fig. 2 is now almost entirely closed by the knob 34 of the pin 25 or in Fig. 4 by the knob 134 of the pin 125, thereby affording a sudden resistance to the compression of the shock absorber calculated to enable complete deflection of the landing wheel tire, during which deflection slight compression of the shock absorber is permitted by the small flow of fluid through the restricted orifice. Subsequently as the tapered portion of the knob 34 passes through the orifice 23, the effective area of that orifice will gradually be increased, thus resulting in an increased velocity of the liquid from the cylinder 11 into the cylinder 15 and a consequential increased speed in the upward movement of the cylinder 11 relative to the cylinder 15. Thereafter as the tapered portion of the pin below the annular shoulder 28 starts its movement through the orifice 23, the effective area of the orifice will gradually be decreased to maintain substantially constant the pressure of the liquid on the piston 21, thereby gradually decreasing the rate of speed of the cylinder 11 relative to the cylinder 15.

With reference to the construction in Fig. 5, the sudden resistance to the compression of the shock absorber is controlled by the location of the metering pin head 226 within the piston counterbore 222. In this instance, a slow flow of the liquid from the cylinder 11 into the cylinder 15 will take place through the restricted port 36, thereby resulting in the head 226 within the counterbore 222 performing the same function as the knob 34 within the orifice 23. Subsequently, as the piston reaches the upper end of the counterbore 222, the flow of the liquid will be checked by the tapered metering pin 225 through the orifice 223 in the manner above described with the identical results.

Subsequent to the landing shocks, the energy stored or dissipated within the shock absorber and the tire of the landing wheel will tend to cause recoil movement of the craft relative to the landing wheel, resulting in the extension of the shock absorber. This recoil movement will of course take place immediately after the end of the compression stroke of the shock absorber, in which instance the liquid conveying capacity of the orifice 23 is greatly reduced by the large inner end portion of the pin located within the orifice, thus resulting in a slow flow of the liquid from the cylinder 11 into the cylinder 15 for checking the recoil movement above referred to. In this instance, it will be understood that during the initial recoil load to which the shock absorber is subjected, the effective area of the orifice 23 will be at its minimum and will gradually increase proportionally to the reduction of the recoil load.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A shock absorber comprising inner and outer telescoping casings having liquid stored therein, end closures for the remote ends of said casings, a piston on the other end of the inner casing, a single liquid transferring orifice through said piston active during the telescopic movement of said casings, said orifice including two portions one greater than the other and held against movement relative to one another, a metering pin carried by the end closure of the outer cylinder and cooperating with the smaller portion of said orifice, and a head on said pin cooperating with the larger portion of said orifice during the end of the extension and the beginning of the compression strokes of said casings for reducing the liquid transferring capacity of said orifice.

2. A shock absorber comprising inner and outer telescoping casings having liquid stored therein, end closures for the remote ends of said casings, a one piece cup-shaped piston on the other end of the inner casing, a single orifice through said piston for transferring liquid from one to the other side of said piston during the telescopic movement of said casings, a metering pin carried by the end closure of the outer cylinder and cooperating with said orifice, and a head on said metering pin engageable with the bottom of said piston for limiting the extension of said casings, said head cooperating with the interior of said piston during the final portion of the extension strokes of said casing for effecting a dash-pot action checking the engagement of said head with the bottom of said piston.

3. A shock absorber comprising inner and outer telescoping casings having liquid stored therein, a cup-shaped piston on the inner end of the inner cylinder having cooperating inner walls held against movement relative to one another, a single orifice through said piston for transferring liquid from one to the other side of said piston during the telescopic movement of said casings, a metering pin carried by the outer cylinder and cooperating with said orifice, a knob on said pin cooperating with said orifice during the initial portion of the compression strokes of said casings for retarding transfer of the liquid through said passage, and a head on said pin above said knob engageable with the bottom of said piston for limiting the extension of said casings.

4. A shock absorber comprising inner and outer telescoping casings having liquid stored therein, a cup-shaped piston on the inner and of the inner cylinder having cooperating inner walls held against movement relative to one another, a single orifice through said piston for transferring liquid from one to the other side of said piston during the telescopic movement of said casings, a metering pin carried by the outer cylinder and cooperating with said orifice, a head on said pin engageable with the bottom of said piston for limiting the extension of said casings, said head cooperating with the interior of said piston during the final portion of the extension strokes of said casings for effecting a dash-pot action, and means through said head independently of said pin for controlling said dash-pot action.

5. A shock absorber comprising inner and outer telescoping casings having liquid stored therein, a piston carried by the inner end of the inner casing having an orifice extending therethrough, a metering pin cooperating with said orifice having one end fixed to the outer casing on one side of said piston and the other end extending through said orifice to the other side of said piston, a head on said pin engageable with said other side of said piston for limiting the extension strokes of said casings, an integral annular shoulder on said pin longitudinally spaced from said other end thereof, said head resting on said shoulder, and means on said other end of said pin for detachably securing said head on said pin against said shoulder.

ARTHUR W. GRIEPENSTROH.